United States Patent [19]

Larsen

[11] Patent Number: 4,708,841
[45] Date of Patent: Nov. 24, 1987

[54] PIPE PLUG APPARATUS AND METHOD FOR ITS USE

[75] Inventor: Olaf E. Larsen, Bartlesville, Okla.

[73] Assignee: Phillips Petroleum Company, Bartlesville, Okla.

[21] Appl. No.: 793,353

[22] Filed: Oct. 31, 1985

[51] Int. Cl.$^4$ .............................................. B29C 47/90
[52] U.S. Cl. ..................................... 264/558; 264/560; 264/209.4; 264/237; 264/348; 425/71; 425/325; 425/326.1; 425/380; 425/387.1; 425/392; 425/467
[58] Field of Search ................................ 264/558–569, 264/348, 178 R, 179, 180, 209.1–209.8, 237, 508; 425/324.1, 71, 72 R, 325, 326.1, 392, 393, 387.1, 388, 380, 381, 466, 467, 403

[56] References Cited

U.S. PATENT DOCUMENTS

| | | | |
|---|---|---|---|
| 2,048,004 | 7/1936 | Hentzell et al. | 425/381 |
| 2,663,904 | 12/1953 | Slaughter | 425/393 |
| 2,698,467 | 1/1955 | Tarquinee et al. | |
| 3,089,187 | 5/1963 | Wolfe | 425/71 |
| 3,249,670 | 5/1966 | Roitner et al. | 264/209.5 |
| 3,296,661 | 1/1967 | De Moustier | 264/560 |
| 3,538,210 | 11/1970 | Gatto | 264/90 |
| 3,784,345 | 1/1974 | Wissinger et al. | 425/325 |
| 3,814,564 | 6/1974 | Streng et al. | 264/560 |
| 3,865,536 | 2/1975 | Johnson et al. | 425/472 |
| 4,017,244 | 4/1977 | Vellani | 264/209.4 |
| 4,084,933 | 4/1978 | Reitemeyer et al. | 425/467 |
| 4,120,926 | 10/1978 | Titz | 264/209.4 |
| 4,157,235 | 6/1979 | Lagabe et al. | 425/71 |
| 4,199,314 | 4/1980 | Lupke et al. | 425/532 |

FOREIGN PATENT DOCUMENTS

| | | | |
|---|---|---|---|
| 1156972 | 5/1959 | Fed. Rep. of Germany | 425/326.1 |
| 2656887 | 6/1978 | Fed. Rep. of Germany | 264/560 |
| 3241005 | 8/1984 | Fed. Rep. of Germany | 264/209.4 |
| 50-30680 | 11/1975 | Japan | 425/325 |
| 6515210 | 5/1967 | Netherlands | 425/326.1 |
| 545484 | 3/1977 | U.S.S.R. | 425/325 |

OTHER PUBLICATIONS

Company brochure of the Höechst Corporation, Frankfurt, pp. 8 and 9.

Primary Examiner—Jeffery Thurlow
Attorney, Agent, or Firm—William R. Sharp

[57] ABSTRACT

A pipe plug apparatus and method for its use are described herein. A pipe plug is provided which includes a first portion, and second and third portions which radially extend from the exterior surface of the first portion so as to surround the first portion. When the plug is positioned in a pipe, liquid is introduced into the space as defined between the second and third portions, and as defined between the pipe interior surface and first portion exterior surface, so as to at least partially fill the space with the liquid.

16 Claims, 5 Drawing Figures

PIPE PLUG APPARATUS AND METHOD FOR ITS USE

BACKGROUND OF THE INVENTION

This invention relates to a pipe plug apparatus. According to another aspect, the invention relates to a method for plugging a pipe, particularly in the environment of pipe extrusion.

A common system for extruding plastic pipe utilizes a pressure calibrating or sizing sleeve which receives a pipe therethrough after having been extruded from an extrusion die. According to such a technique, a plug is connected to the die by a cable or other suitable connecting means, and positioned within the pipe downstream from the die. Air is then pumped into the pipe between the die and the plug so as to pressurize the interior of the pipe above atmospheric pressure, typically about 5 to 10 p.s.i.g. Thus, the initially soft pipe being extruded from the die is pressed against the interior surface of the pressure sizing sleeve so as to properly size the pipe while in its soft and heated state. In addition, cooling water is typically circulated through the pressure sizing sleeve to assist in cooling the extruded pipe as it passes through the sleeve.

The above-mentioned plug utilized in the pressure system typically comprises at least two annular seal members connected by a suitable means such as a small diameter rod. Such plugs are quite heavy. For example, a plug employed for the extrusion of a 48-inch diameter pipe would normally weigh as much as 700 pounds. Several disadvantages result from the weight of the plug. One such disadvantage is the poor seal provided by the plug. The excessive weight of the plug provides a good seal between the seal members and the interior surface of the pipe at the bottom portions of the seal members, but a very loose seal is consequently obtained at the top portions of the seal members. Additionally, the weight of the plug causes a tremendous amount of drag on the extruded pipe, thus causing excessive wear of the bottom portions of the seal members, among many other problems. Therefore, the service life of such a plug is relatively short, necessitating frequent replacement of the seal members.

SUMMARY OF THE INVENTION

It is, therefore, an object of the invention to provide an improved pipe plug apparatus and method for its use in pipe extrusion.

It is also an object of the invention to provide a pipe plug apparatus and method for its use wherein the disadvantageous effects of the weight of the plug are at least to some extent counteracted.

The above objects of the invention are realized by the following aspects of the invention.

According to one aspect, an apparatus is provided which includes a pipe plug which comprises a first portion having an exterior surface, and second and third portions which radially extend from the first portion exterior surface. In addition, the second and third portions are axially spaced from one another, and surround the first portion. A space is defined between the second portion and the third portion, the space also being defined by the first portion exterior surface. Further, the second and third portions are adapted to sealingly engage, around their circumferences, the interior surface of a pipe. The apparatus further comprises a means for introducing a liquid into the above-defined space.

According to yet another aspect of the invention, an apparatus is provided which comprises an extrusion means for extruding pipe therefrom, wherein the extrusion means includes a die; and extruded pipe extended from the die; a pipe plug substantially as described above, sealingly positioned within the pipe; a means for introducing a liquid into the space defined between the second and third portions and between the first portion and the interior surface of the pipe; and a connecting means for connecting the plug to the die.

A method of plugging a pipe is also provided according to the present invention, wherein the method comprises: positioning a pipe plug within the pipe, wherein the pipe is constructed substantially as described above; and at least partially filling the above-defined space with a liquid.

As will become more apparent below, introducing liquid into the space between the second and third portions while the plug is positioned within a pipe provides a buoyant force to the plug upon at least a partial filling of the space with the liquid. Such a buoyant force counteracts at least to some degree the weight of the plug, thus at least partially overcoming the disadvantages which stem from the weight of the plug.

According to an illustrated embodiment, hereinafter described in detail, each of the second and third portions comprises a seal assembly. Each seal assembly includes annular seal rings for sealingly engaging the interior surface of the pipe. The above-mentioned first portion comprises an elongated hollow member. Most preferably, water is allowed to fill the space between the second and third sealing portions to a certain liquid level whereby the buoyant force imparted to the plug is approximately equivalent to the weight of the plug. When such a condition is met, the weight of the plug is offset by the buoyant force.

DESCRIPTION OF THE PREFERRED EMBODIMENTS

A preferred embodiment of a pipe plug apparatus and method for its use will now be described with reference to the Figures. It should be understood that although the herein described pipe plug apparatus is described in the environment of pipe extrusion, the pipe plug apparatus could be used in other environments according to certain aspects of the invention.

Figure 1:
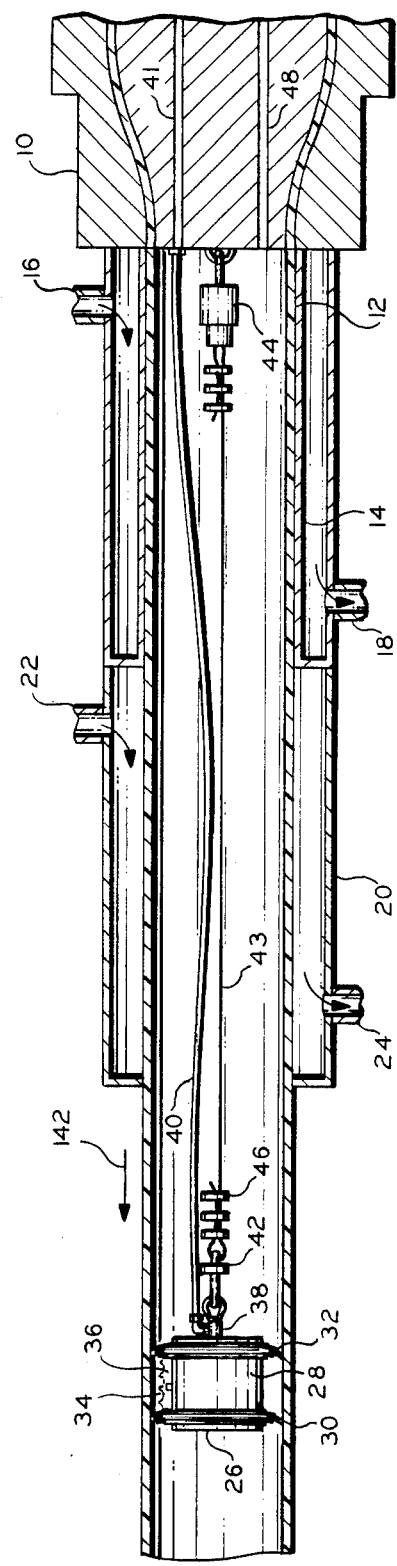
FIG. 1 is a schematic representation of a pipe extrusion apparatus utilizing a pipe plug according to the present invention.

Referring now to FIG. 1, there is shown a schematic illustration of a pipe extrusion apparatus according to the invention, wherein various supporting structures and structural details have been omitted for the sake of clarity. The apparatus of FIG. 1 includes a conventional pipe extrusion die 10 for extruding thermoplastic pipe 12 therefrom. A section of pipe 12 is shown as extending from die 10 after extrusion. A generally annular pressure sizing sleeve 14 surrounds extruded pipe 12 so as to contact the exterior surface of the pipe, and serves to properly size or calibrate the dimensions of pipe 12 as the soft extrudate passes from die 10. The inside wall of sizing sleeve 14 can be smooth, for example chrome plated, or slightly roughened, depending on the type of material used for the pipe. In addition to the sizing or calibration function of the sleeve 14, it also serves to cool the pipe 12 by means of a continuous circulation of water through the interior of the sleeve. As shown, cooling water is admitted at inlet 16, and ejected at outlet 18. This cooling water is typically heated to about 200° F. before being circulated through sizing sleeve 14. This temperature is considerably cooler than the extruded pipe, which is at a temperature of about 400° F. to about 280° F. in the region of sizing sleeve. Thus, although the water admitted to the sizing sleeve 14 is heated, primarily for the purpose of providing a better surface on the finished pipe, it acts to cool pipe 12 due to the temperature difference. Located downstream from pressure sizing sleeve 14 is cooling bath sleeve 20 through which cooling water maintained at about 60° F. is circulated by means of inlet 22 and outlet 24. This stage of the apparatus serves to further cool and harden the extruded pipe 12. It is emphasized that cooling bath sleeve 20 is a simplified schematic representation of this portion of the extrusion apparatus, and can take several alternative forms such as a plurality of water sprayers positioned around pipe 12.

A pipe plug 26 is positioned within the pipe 12 downstream from cooling sleeve 20. The distance between plug 26 and sleeve 20 can vary widely, the distance shown not necessarily being to scale. In addition, a puller (not shown), typically comprising rotating puller belts, can be positioned between plug 26 and sleeve 20 for assisting in pulling extruded pipe 12 from die 10. Such a puller could also be provided on the opposite side of plug 26 if desired.

As shown, plug 26 includes a generally cylindrical member 28 and two seal assemblies, 30 and 32, which are secured to member 28. Each seal assembly includes seal rings, shown and described in more detail below, which sealingly engage around their circumferences the interior surface of pipe 12. A generally annular space 34 is thereby defined between the exterior surface of member 28 and the interior surface of pipe 12, and between seal assemblies 30 and 32. Space 34 is shown in the illustrated embodiment as being partially filled with a liquid 36, preferably water. This liquid is introduced into space 34 by means of a manifold 38, only a portion of which is shown, and a hose 40 which is connected at one end through suitable pipe fittings to manifold 38 and at its other end to die 10. Hose 40 is preferably made of a flexible, yet strong material, such as braided rubber. It is also preferable that hose 40 is somewhat longer than the distance between plug 26 and die 10 so as to allow some slack. Hose 40 is suitably connected to die 10 so as to be in communication with a conduit or passage 41. Conduit 41 can simply be an extension of hose 40 to simplify construction, providing the material used for hose 40 is compatible with temperature conditions within the die.

Plug 26 is connected to die 10 through a series of elements which include a swivel mechanism 42, a cable 43 connected at one end to swivel mechanism 42, and a swivel mechanism 44 connected to the other end of cable 43. Swivel mechanisms 42 and 44 are provided due to a tendency for pipe 12 to rotate while being extruded, thereby also causing plug 26 to rotate. Several clips such as shown at 46 are provided to securely clamp the cable which is looped through each of the swivel mechanisms. The above described connecting means for connecting plug 26 to die 10 functions to maintain plug 26 in a fixed position during extrusion of pipe 12.

Finally, with respect to FIG. 1, a conduit or passage 48 is provided through die 10 for passing compressed air therethrough so as to flow into the interior of pipe 12 between die 10 and plug 26. Typically, a pressure of about 10 to about 15 p.s.i.g. is achieved between the plug and the die. As noted above, the pressurized air functions to press pipe 12 against the exterior surface of pressurizing sleeve 14 so as to properly maintain the correct dimensions for the soft pipe after having been extruded from the die.

Figure 2:
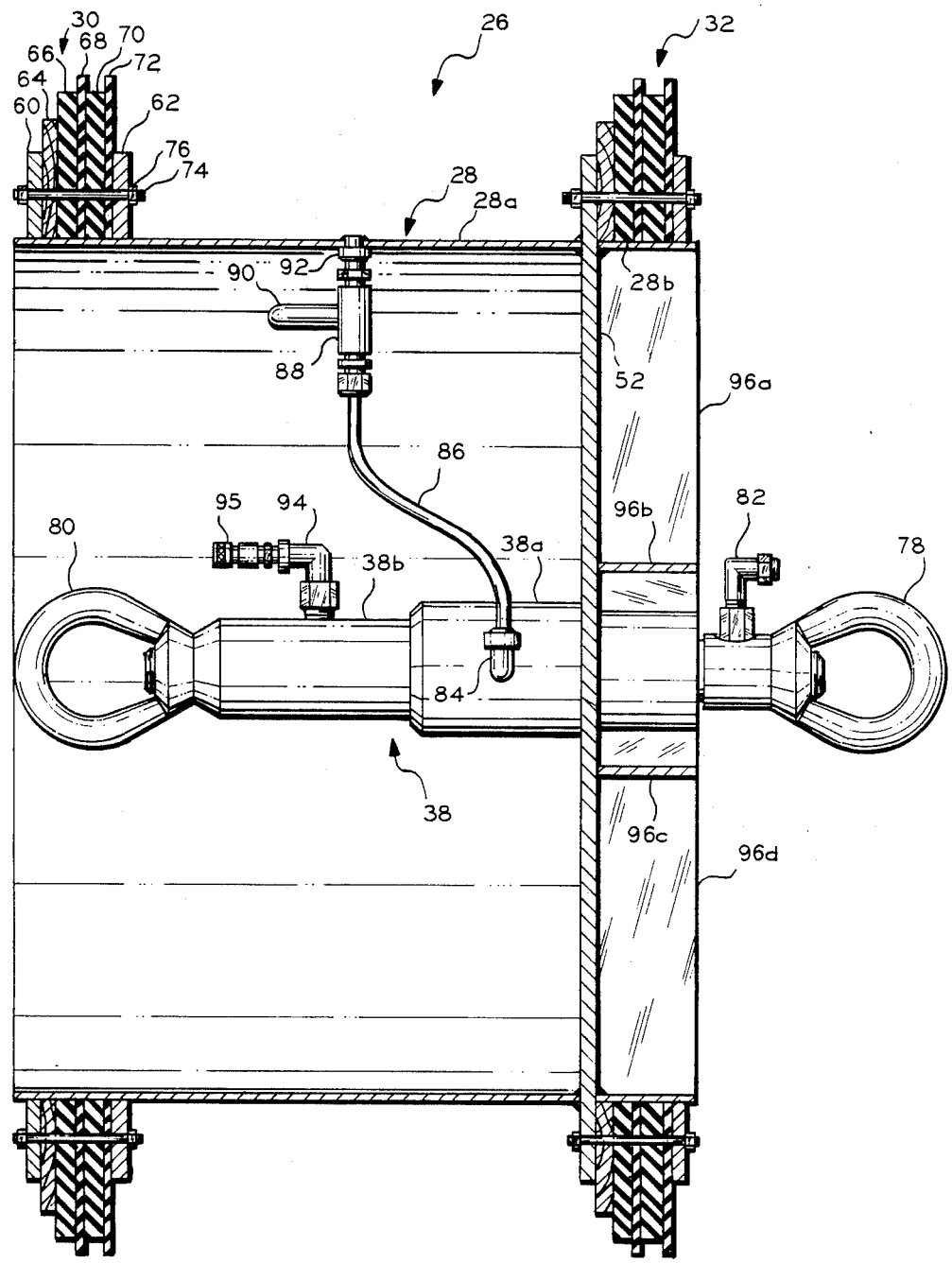
FIG. 2 is a cross-sectional view of the pipe plug shown in FIG. 1, wherein the plug includes a manifold for receiving a flow of liquid therethrough.

Referring now to FIG. 2, there is shown a cross-sectional view of pipe plug 26. Pipe plug 26 includes a hollow member 28 which is preferably cylindrical in shape and made of a light weight metal such as aluminum. Aluminum is the presently preferred material, but magnesium could also be used to achieve even further weight reductions. As shown, hollow member 28 comprises section 28a, which is welded at one end to a face of plate 52, and a section 28b which is welded at one end to the opposing face of plate 52. Plate 52, also preferably of aluminum, is generally circular in shape, and has a larger diameter than that of hollow member 28 so as to extend beyond the exterior surface of hollow member 28. Seal assemblies 30 and 32 radially extend from the exterior surface of member 28, and are axially spaced from one another. Also as shown, each seal assembly surrounds hollow member 28.

With respect to seal assembly 30, this assembly includes clamp rings 60 and 62, each of which is preferably constructed of aluminum. Clamp ring 62 is welded at its inner perimeter to the exterior surface of member 28. A series of rings are sandwiched between clamp rings 60 and 62, wherein this series of rings includes: back-up ring 64, preferably of marine plywood; back-up ring 66, made preferably of a strong, flexible material such as nylon corded rubber; a seal ring 68, preferably of an uncorded rubber; and respective back-up and seal rings 70 and 72 which are substantially identical to rings 66 and 68. Back-up rings 66 and 70 are several times thicker than seal rings 68 and 72 so as to support seal rings 68 and 72 and prevent their collapse during the use of the plug in pipe extrusion. In addition, the diameters of seal rings 68 and 72 are preferably slightly greater than the outside diameter of the pipe to allow for compression of the seal rings during use of the plug. Several types of rubber materials can be employed for rings 66, 68, 70 and 72, such as neoprene and silicon rubber, although neoprene is generally preferred. Most importantly, the rubber material utilized should be resistant to the temperatures encountered during pipe extrusion. The above-described rings which comprise seal assembly 30 are secured together by a bolt 74 which passes through the assembly, and nuts as shown in 76. Each of the rings are mounted so as to be generally coaxial with respect to member 28. Seal assembly 32 is similar in construction to assembly 30, except that assembly 32 utilizes plate 52 in the place of a clamp ring.

Manifold 38 is positioned substantially within hollow member 28 so as to extend axially therethrough. Manifold 38 comprises a sleeve 38a and a spindle 38b. Sleeve 38a is mounted to and extends through plate 52. The cross section in FIG. 2 is a zigzag cross section so that the sectioned plate 52 extends beyond sleeve 38a. The cross-sectional cut of FIG. 2 will become more apparent with reference to FIGS. 3 and 4. Spindle 38b is an elongated member, which extends completely through sleeve 38a and which is mounted within sleeve 38a so as to allow rotation of sleeve 38a with respect to spindle 38b. Mounting spindle 38b within sleeve 38a in this manner prevents undesirable twisting of hose 40, shown in FIG. 1, which can occur due to rotation of pipe 12 and plug 26 during extrusion. Rotation of plug 26 causes rotation of sleeve 38a due to it being fixedly secured to member 28 through plate 52. Spindle 38b will tend to remain stationary during such rotation of plug 26. One end of spindle 38b has an eye nut 78 threaded thereon, and the other end of spindle 38b has an eye nut 80 threadedly secured thereto. A cable for connecting the plug to the die can be connected to the plug through a suitable swivel mechanism as shown in FIG. 1, and eye nut 80 can serve to connect plug 26 to a trailer plug. A trailer plug is a plug inserted into the extruded pipe behind the main plug when the seals on the main plug have worn out. Providing such a trailer plug is a convenient way to maintain the necessary seal for the compressed air with a minimum of down time for the extrusion apparatus.

A manifold inlet fitting assembly 82, which can be connected to hose 40 as shown in FIG. 1, is connected to the front end of spindle 38b. A manifold outlet fitting assembly 84 is also provided for passing exiting liquid therethrough. Outlet fitting assembly 84 is connected to sleeve 38a in a manner which will be discussed in more detail with reference to FIG. 5, and is connected to one end of a conduit 86, which is most conveniently a section of copper tubing. The other end of conduit 86 is connected through a fitting to a ball valve 88. Ball valve 88 includes a handle 90 which can be manually manipulated to open or close the valve. The position of handle 90 in FIG. 2 is the open position. The outlet side of ball valve 88 is connected to a nipple 92. Nipple 92 defines a plug outlet fluid passageway which extends through the wall of hollow member 28 and its exterior surface so as to communicate with the space defined between the seal assemblies and by the exterior surface of hollow member 28. As can be seen from FIG. 2, no fluid passageway other than the plug outlet fluid passageway is provided through the exterior surface of hollow member 28 for communication with the space between the seal assemblies. Therefore, the manifold 38, conduit 86, and various elements associated therewith constitute a means for defining a flow path which extends from the interior of hollow member 28 to the plug outlet. Another fitting assembly 94 is provided to enable connection of a trailer plug (not shown) through a quick disconnect fitting 95. As will become more clear with reference to FIG. 5, fitting assembly 94 is connected to spindle 38b so as to receive liquid which is passed through fitting assembly 82 and spindle 38b, thus providing a supply of liquid to a trailer plug which can be connected to fitting assembly 94.

A plurality of reinforcement spokes extend between the front end of sleeve 38a and the interior surface of section 28b of hollow member 28. A total of six spokes are provided, only four of which are shown in FIG. 2, namely 96a, b, c and d. Each spoke essentially comprises an elongated plate having the edge of one end mounted to the interior surface of section 28b, the edge of the other end mounted to the exterior of sleeve 38b, and a side edge mounted to the front face of plate 52. The spokes are preferably spaced around sleeve 38b in an equiangular fashion, an angle of 60° being preferably defined between any two of the spokes. The primary purpose of the spokes is to provide reinforcement for plate 52 which experiences a great amount of force in a direction parallel to the manifold axis during the extrusion process. Thus, the spokes tend to prevent buckling of plate 52.

Figure 3:
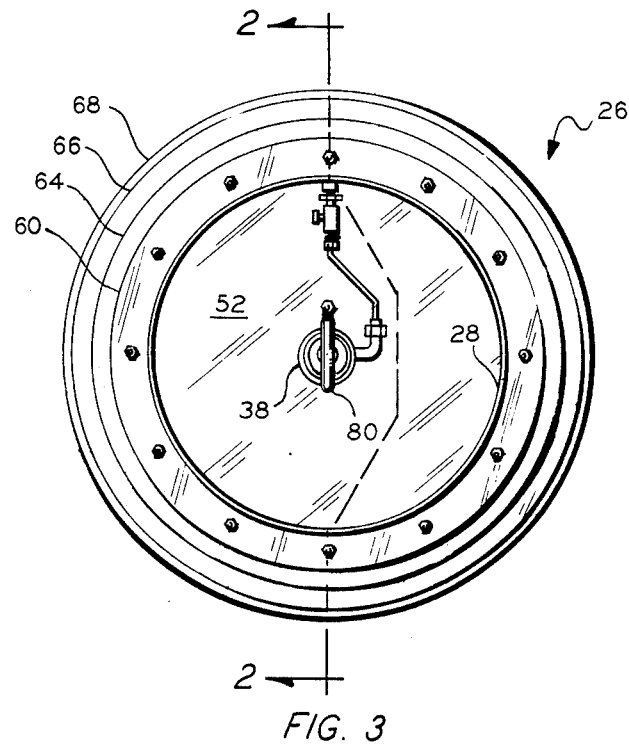
FIG. 3 is a view of the left hand end of the plug illustrated in FIG. 2.

Referring now to FIG. 3, there is shown an end view of plug 26 which clearly shows the generally annular shape of the various rings described above, rings 60, 64, 66 and 68 being shown in this Figure. FIG. 3 also clearly shows the preferred generally cylindrical shape of hollow member 28.

Figure 4:
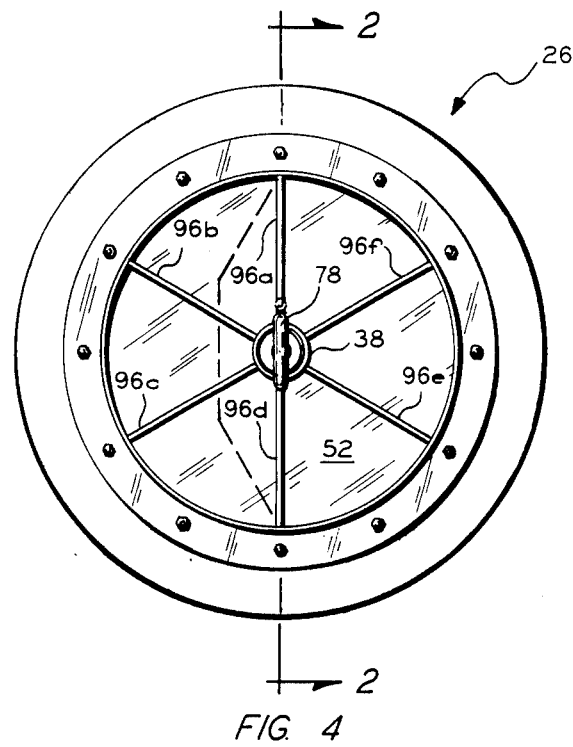
FIG. 4 is a view of the right hand end of the plug as shown in FIG. 2.

Referring to FIG. 4, another end view of plug 26 is shown which more clearly shows the arrangement of the reinforcement spokes. As shown, six spokes, 96a–f, are shown which are equiangularly spaced from one another around manifold 38.

Figure 5:
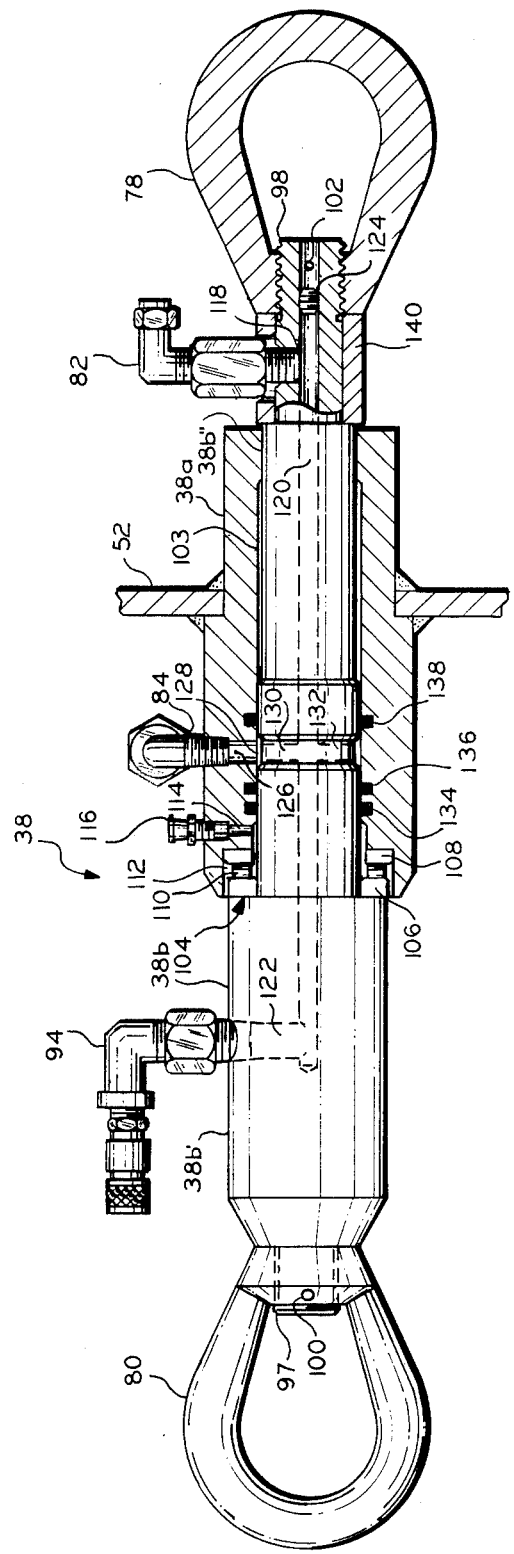
FIG. 5 is a detailed view of the above-mentioned manifold which shows a cross-section of a portion of the manifold. That portion of the manifold shown in cross-section is rotated counter-clockwise 90° from the position shown in FIG. 2, for ease of illustration, as will be described further below.

Referring now to FIG. 5, there is shown a more detailed view of manifold 38, wherein sleeve 38a is rotated counterclockwise 90° from the position shown in FIG. 2 for ease of illustration. Sleeve 38a, shown in cross section, is generally cylindrical in shape, and is preferably constructed of aluminum. Spindle 38b is an elongated member, preferably of stainless steel, which extends from end 97 to end 98, each end being threaded to receive respective eye nuts 80 and 78 thereon. Holes 100 and 102 are provided which extend through ends 97 and 98 respectively, and also through the eye nut associated with each end. A roll pin can be inserted through each of holes 100 and 102 so as to prevent unscrewing of each eye nut. As shown, spindle 38b includes an enlarged section 38b' and a section 38b'' of reduced diameter which extends from section 38b' to end 98. Section 38b'' extends through sleeve 38a so as to be generally coaxial therewith, section 38b'' being mounted within sleeve 38a so as to allow rotation of sleeve 38a with respect to spindle 38b as noted above. To enhance ease of sleeve rotation, an elongated gap 103 is provided between the interior surface of sleeve 38a and the exterior surface of spindle 38b to minimize the surface contact between the sleeve and spindle.

Rotation of sleeve 38a is also aided with roller bearing 104. Roller bearing 104 includes a ring 106 and a ring 108, between which a plurality of rollers as shown at 110 are positioned in a conventional fashion. Only two rollers 110 are shown in FIG. 5. Each of these illustrated rollers has a rotational axis which is generally perpendicular to the longitudinal axis of spindle 38b and sleeve 38a. Thus, rollers 110 are allowed to roll in a circular pattern between rings 106 and 108. As shown, bearing 104 is positioned in an annular groove 112 in sleeve 38a so that ring 106 abuts an end face of section 38b' of spindle 38b, and so that ring 108 is in abutment with the exterior surface of sleeve 38a. During rotation of sleeve 38a with respect to spindle 38b, ring 106 generally remains stationary while ring 108 rotates with sleeve 38a. One commercially available roller bearing suitable for use with the invention is Model No. NTHA-3258, manufactured by Torrington Corporation of Torrington, Conn. Although a roller bearing is ideal for use with the present system due to its ability to carry heavy loads at limited speeds, other types of bearings, such as ball bearings, can be employed if desired. Manifold 38 further includes a passage 114 which communicates with groove 112. Fitting 116, which is received by passage 114, can be removed to inject lubricating oil into passage 114 for lubrication of bearing 104.

The various liquid flow paths within manifold 38 will now be described. Firstly, spindle 38b has a manifold inlet opening 118 which receives an end of fitting assembly 82. Inlet 118 communicates with a passageway 120 which longitudinally extends through spindle 38b from end 98 to a passage 112. Passage 112 communicates with fitting assembly 94. As shown, passageway 120 is plugged near end 98 with socket head plug 124. Socket head plug 124 can be periodically removed from passageway 120 to remove various deposits from the passageway. A manifold outlet opening at 126 is provided through the wall of sleeve 38a. Fluid communication between manifold outlet 126 and the passageway 120 is provided by means of a groove 128 which extends around spindle 38b and two holes 130 and 132 in spindle 38b which extend from passageway 120 to groove 128. Thus, regardless of the rotational position of sleeve 38a, liquid may pass from passageway 120, through holes 130 and 132, and around groove 128 to outlet opening 126.

O-rings 134, 136 and 138 are appropriately positioned within grooves in sleeve 38a so as to sealingly engage the exterior surface of spindle 38b on both sides of groove 128. Two O-rings, 134 and 136, are provided on the side of groove 128 nearest passage 114 in order to ensure that oil from passage 114 does not enter the liquid stream flowing from passageway 120 to outlet opening 126. Of course, the primary function of the O-rings is to prevent leakage of liquid from groove 128.

The apparatus of FIG. 5 further includes a spindle locator ring 140 which is loosely mounted around spindle 38b so as to be positioned between sleeve 38a and eye nut 78. Spindle locator ring 140 acts to maintain spindle 38b in the desired position with respect to the outlet opening 126 and the various O-rings. It is preferred that ring 140 not be permanently mounted to spindle 38b, thus enabling disassembly of the manifold.

As noted previously, the construction of manifold 38 allows for introduction of liquid to the space between the seal assemblies without substantial twisting of hose 40.

Operation of the illustrated apparatus will now be described with reference to the Figures. With reference to FIG. 1, pipe 12 is extruded from die 10 so as to move at a predetermined rate in the direction indicated at 142. Pipe plug 26 is positioned within pipe 12 as shown, and liquid is then passed through hose 40 to plug 26. The preferred liquid is water, due to its low expense, but other liquids could be used if desired. Generally, it can be stated that the denser the liquid, the more buoyant force can be imparted to plug 26. If water is utilized, the most convenient water source is simply a municipal water tap. Referring to FIG. 5, liquid from hose 40 enters inlet fitting assembly 82, and then flows through passageway 120, through holes 130 and 132 and into groove 128. If holes 130 and 132 are not aligned with outlet opening 126, the liquid flows around groove 128 and then into outlet passage 126. Referring back to FIG. 2, the liquid then passes through manifold outlet fitting 84, into conduit 86, through ball valve 88 and out the plug outlet 92 so as to flow into the space defined between the seal assemblies. As should be readily apparent, no liquid is passed through a fluid passageway extending through the exterior surface of hollow member 28 other than the plug outlet fluid passageway, so that no liquid is withdrawn from space 34 and through hollow member 28 to outside the plug. defined by nipple Space 34 shown in FIG. 1 is at least partially filled with liquid so as to impart a buoyant force to plug 26 which is opposite in direction to the force vector associated with the plug weight. As discussed above, this buoyant force at least partially offsets the weight of the plug so as to relieve the pressure exerted on the bottom portions of the seal assemblies, thereby providing a better seal for the compressed air between the plug and the die. Most preferably, liquid is introduced to space 34 so as to attain a liquid level whereby the buoyant force exerted on the plug approximately equals the weight of the plug. According to such a condition, the plug 26 will be concentric with respect to pipe 12. Most importantly, the forces exerted on the seal rings are evenly distributed around their circumferences. This provides for an optimum seal, and also serves to lengthen the service life of the seal assemblies.

The above discussed preferred condition wherein the buoyant force is equivalent to the weight of the plug can also be expressed as follows, wherein:

$$(\rho g)V = W,$$

where $(\rho g)$ is the weight-density of the liquid, W is the weight of the plug, and V is the volume of liquid displaced. This equation is derived from the well-known physics principle wherein the buoyant force is equivalent to the weight of the liquid displaced, such displaced liquid weight being the density of the liquid $(\rho g)$ times the volume (V) of liquid displaced.

The simplest technique of filling space 34 to a liquid level which achieves the preferred condition wherein buoyant force equals weight involves visually inspecting the position of plug 26. The preferred condition is approximately met when plug 26 is concentric with respect to pipe 12. If the preferred condition cannot be met because of excessive weight of the plug, the maximum buoyant force is imparted to plug 26 by filling space 34 completely with liquid.

Of course, some leakage of liquid around the seal assemblies will occur during extrusion. Some of this liquid which leaks into the interior of pipe 12 between the plug and the die can be removed with a siphon and air lock if desired. Additionally, liquid will also be lost by evaporation. The liquid lost from space 34 is preferably replaced with further liquid. Since the liquid loss is fairly continuos, a predetermined flow of liquid can be passed into space 34 so as to continually make up for that liquid lost. The correct flow rate can be found by trial and error simply by finding the flow rate which will maintain a concentric position of plug 26 within the pipe. As is more typical in actual practice, however, the position of plug 26 is periodically monitored, and liquid is passed into space 34 periodically when plug 26 is detected to sag below the desired concentric position. If space 34 is to be filled completely with liquid continuously, the position of plug 26 can be periodically monitored to see if it drops with respect to the longitudinal axis of pipe 12 so as to indicate that space 34 is not full with liquid. Liquid would then be passed to space 34 until the space is full. Filling of the space 34 can be indicated by means of a pressure guage in the liquid supply line (not shown), which should show a pressure increase after the space 34 is filled with liquid.

As an alternative to the manual liquid level control discussed above, the liquid level could be controlled automatically using a level sensing means and a suitable controller. According to such a mode of operation, the desired liquid level would first be determined, and the control apparatus set to automatically maintain this level.

In addition to the advantageous buoyancy imparted to the plug according to the invention, some other advantages also result from providing liquid between the seal assemblies of a plug positioned in a pipe. First, the liquid acts as a lubricant to extend the lives of the seal rings. Second, the presence of the liquid acts as a seal to reduce air leakage during pressure pipe extrusion. Third, the liquid serves to cool the extruded pipe. Finally, the liquid protects the seal assemblies from heat, thereby allowing increased extrusion rates. This advantage stems from the fact that extruded pipe generally increases in temperature with an increasing extrusion rate. This limits the rate at which pipe can be extruded due to the possibility of destroying seal rings from excessive heat. Cooling the rings with liquid therefore enables faster extruding.

Obviously many modifications and variations of the present invention are possible in light of the above teachings. For example, although member 28 is described as being hollow, it is within the scope of the invention to provide a solid member 28. This would not normally be advantageous, however, because it is desirable that the weight of member 28 be minimized and its volume maximized so as to displace a maximum amount of liquid and consequently provide a maximum buoyant force. It is, therefore, to be understood that within the scope of the appended claims, the invention may be practiced otherwise than as specifically described.

What is claimed is:

1. An apparatus comprising:
   a pipe plug which includes a first portion having an exterior surface with a plug outlet fluid passageway therethrough, said plug also including second and third portions, adapted to sealingly engage around their circumferences the interior surface of a pipe, which radially extend from said exterior surface so as to surround said first portion and which are axially spaced from one whereby a space which communicates with said plug outlet fluid passageway is defined between said second portion and said third portion, said space also being defined by said exterior surface, and wherein no fluid passageway is provided which passes through said exterior surface to communicate with said space other than said plug outlet fluid passageway; and
   a means for introducing a liquid through said plug outlet fluid passageway and into said space.

2. An apparatus as recited in claim 1, wherein said first portion comprises a hollow member.

3. An apparatus as recited in claim 2, wherein said liquid introducing means includes a means for defining a flow path which extends from the interior of said hollow member to said plug outlet fluid passageway.

4. An apparatus comprising:
   a pipe plug which includes a first portion which comprises a hollow member having a wall defining an exterior surface with a plug outlet therethrough, said plug also including second and third portions, adapted to sealingly engage around their circumference the interior surface of a pipe, which radially extend from said exterior surface so as to surround said hollow member and which are axially spaced from one another, whereby a space is defined between said second portion and said third portion and also by said exterior surface;
   a means for introducing liquid into said space, wherein said means includes a manifold positioned substantially within said hollow member, said manifold comprising a sleeve fixedly secured to said hollow member, said manifold also comprising an elongated spindle which extends through said sleeve and which is mounted within said sleeve so as to allow rotation of said sleeve with respect to said spindle, said spindle having a manifold inlet and a manifold outlet, wherein said spindle has a passageway threrethrough which provides fluid communication between said manifold inlet and outlet, said means further comprising a conduit connected between said manifold outlet and said plug outlet, whereby a flow path is defined by said manifold and said conduit which extends from the interior of said hollow member to said plug outlet.

5. An apparatus as recited in claim 4, wherein each of said second and third portions includes at least one generally annular seal ring mounted generally coaxially with respect to said hollow member.

6. An apparatus as recited in claim 5, wherein said space is generally annular in shape.

7. An apparatus as recited in claim 6, wherein said hollow member is aluminum.

8. An apparatus comprising:
   an extrusion means for extruding pipe therefrom, said extrusion means including a die;
   a pipe extending from said die;
   a pipe plug positioned within said pipe, said plug including a first portion which comprises a hollow member having an exterior surface with a plug outlet fluid passageway therethrough, said plug also comprising second and third portions which radially extend from said exterior surface so as to surround said hollow member and which are axially spaced from one another, wherein each of said second and third portions is in sealing engagement around the circumference thereof with the interior surface of said pipe, and wherein a space which communicates with said plug outlet passageway is defined between said second portion and said third portion and between said exterior surface of said hollow member and said interior surface of said pipe
   a means for introducing a liquid through said plug outlet fluid passageway into said space which includes a manifold positioned substantially within said hollow member, said manifold comprising a sleeve fixedly secured to said hollow member, said manifold also comprising an elongated spindle which extends through said sleeve and which is mounted within said sleeve so as to allow rotation of said sleeve with respect to said spindle, said spindle having a manifold inlet and a manifold outlet, wherein said spindle has a passageway therethrough which provides fluid communication between said manifold inlet and outlet, said liquid introducing means further comprising a conduit connected between said manifold outlet and said plug outlet, whereby a flow path is defined by said manifold and said conduit which extends from the interior of said hollow member to said plug outlet; and a connecting means for connecting said plug to said die.

9. An apparatus as recited in claim 8 wherein no fluid passageways other than said plug outlet fluid passageway is provided which passes through said exterior surface of said hollow member to communicate with said space.

10. An apparatus as recited in claim 8, wherein said liquid introducing means further includes means for defining a liquid flow path which extends from said die, through said pipe and to said manifold inlet.

11. An apparatus as recited in claim 10, wherein each of said second and third portions includes at least one generally annular seal ring in sealing engagement around its circumference with the interior surface of said pipe.

12. A method of plugging a pipe, comprising:
(a) positioning a pipe plug within said pipe, said plug comprising a first portion having an exterior surface, said plug also comprising second and third portions which radially extend from said exterior surface and which are axially spaced from one another, each of said second and third portions surrounding said first portion, wherein each of said second and third portions is in sealing engagement around the circumference thereof with the interior surface of said pipe, and wherein a space is defined between said second portion and said third portion and between said first portion exterior surface and said interior surface of said pipe; and
(b) maintaining a condition whereby said space is at least partially filled with liquid, wherein no liquid is passed through a fluid passageway extending through said exterior surface other than a plug outlet fluid passageway which extends through said exterior surface to communicate with said space, and wherein liquid is allowed to fill said space to a certain liquid level wherein the buoyant force exerted on said plug approximately equals the weight of said plug.

13. A method as recited in claim 12, further comprising the step of extruding said pipe from an extrusion die, said plug being positioned in said pipe during said extruding step.

14. A method as recited in claim 15, wherein in step (b), liquid is introduced into said space so that said liquid passes from said die, through said pipe, into the interior of said plug, and out said plug outlet fluid passageway into said space.

15. A method as recited in claim 13 wherein said liquid is water.

16. A method as recited in claim 12, wherein said space is filled with liquid so as to provide a condition wherein said plug is generally concentric with respect to said pipe.

* * * * *

UNITED STATES PATENT AND TRADEMARK OFFICE
CERTIFICATE OF CORRECTION

PATENT NO.   :   4,708,841
DATED        :   11/24/87
INVENTOR(S)  :   Olaf E. Larsen It is certified that error appears in the above-identified patent and that said Letters Patent is hereby corrected as shown below:

Column 9, claim 1, line 48, after the word "one", insert ---another,---.

Column 11, claim 10, line 14, after the word "pipe", insert ---,---.

Signed and Sealed this

Twenty-first Day of March, 1989

Attest:

DONALD J. QUIGG

Attesting Officer

Commissioner of Patents and Trademarks